D. E. NORRIS.
CHECK VALVE.
APPLICATION FILED JUNE 19, 1915.
1,219,848.
Patented Mar. 20, 1917.
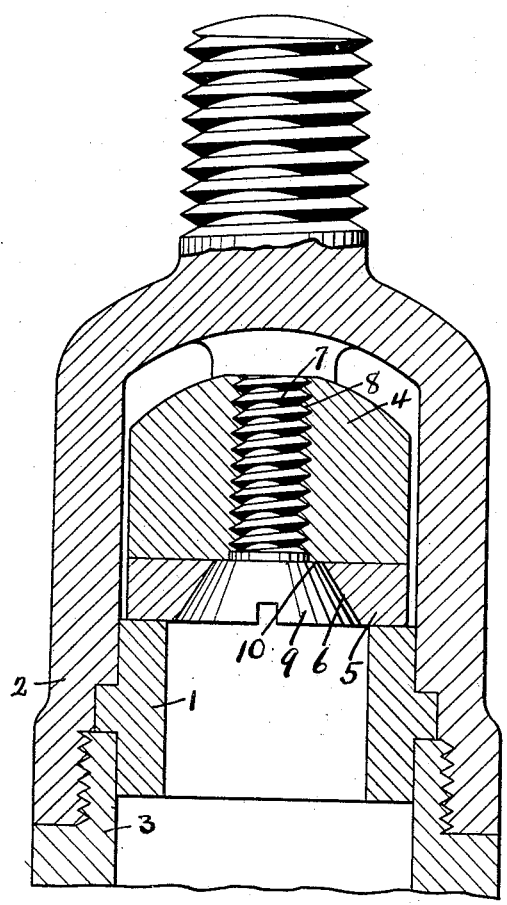

UNITED STATES PATENT OFFICE.

DANIEL E. NORRIS, OF ROBINSON, ILLINOIS.

CHECK-VALVE.

1,219,848.     Specification of Letters Patent.     Patented Mar. 20, 1917.

Application filed June 19, 1915. Serial No. 35,093.

*To all whom it may concern:*

Be it known that I, DANIEL E. NORRIS, a citizen of the United States, residing at Robinson, in the county of Crawford and State of Illinois, have invented new and useful Improvements in Check-Valves, of which the following is a specification.

This invention relates to check valves and consists in certain improvements in the construction thereof as will be hereinafter fully described and pointed out in the claims.

More particularly the valve is designed for use in deep wells where the valve is subjected to very high pressure and difficult conditions. The invention as illustrated is in the form of a standing valve but it will be understood that it may be used in other connections especially in the plunger.

In the drawings 1 marks the valve seat, 2 the valve cage, 3 the standing valve, 4 the body of the valve check and 5 the check valve face.

The check valve face has a tapered or beveled opening 6. A screw 7 is screwed into a screw threaded perforation 8 in the body 4. The screw has the tapered head 9 engaging the walls of the perforation.

The screw preferably has a flat inner face which engages the face of the valve body. In this manner the screw can be seated against the body so as to lock it in place.

The outer face of the screw is positioned at or below the face of the soft valve face 5 so that there is an unobstructed surface to the valve 6.

By using the beveled surface the beveled head of the screw may be brought below the surface of the soft face so as to give the full capacity to the valve and prevent any chance for the face of the screw contacting the valve seat. At the same time the soft face is clamped in position by the screw and this support extends into close proximity with the valve seat. This is of considerable importance where the valve is subjected to very high pressure as in deep wells.

In the illustration only a central sectional view is shown. It will be understood that the parts shown are annular shape.

What I claim as new is:—

1. In a check valve, the combination of an annular seat; a valve check comprising a body having a screw thread therein; a soft valve face having a perforation with tapered walls; and a screw in said screw thread having a tapered head engaging the walls of the perforation with its periphery adjacent to the inner edge of the seat, the face of the screw being positioned to give an unobstructed surface to the valve face.

2. In a check valve, the combination of an annular seat; a valve check comprising a body having a screw thread therein; a soft valve face having a perforation with tapered walls; and a screw in said screw thread having a tapered head engaging the walls of the perforation with its periphery adjacent to the inner edge of the seat, the face of the screw being positioned to give an unobstructed surface to the valve face, said head extending through the perforation and engaging the body of the check.

In testimony whereof I have hereunto set my hand in the presence of two subscribing witnesses.

DANIEL E. NORRIS.

Witnesses:
F. H. NORRIS,
MAUDE NORRIS.

Copies of this patent may be obtained for five cents each, by addressing the "Commissioner of Patents, Washington, D. C."